Dec. 19, 1950        S. V. HART        2,534,769
PHOTOELECTRIC MOTOR CONTROL
Filed Aug. 29, 1946
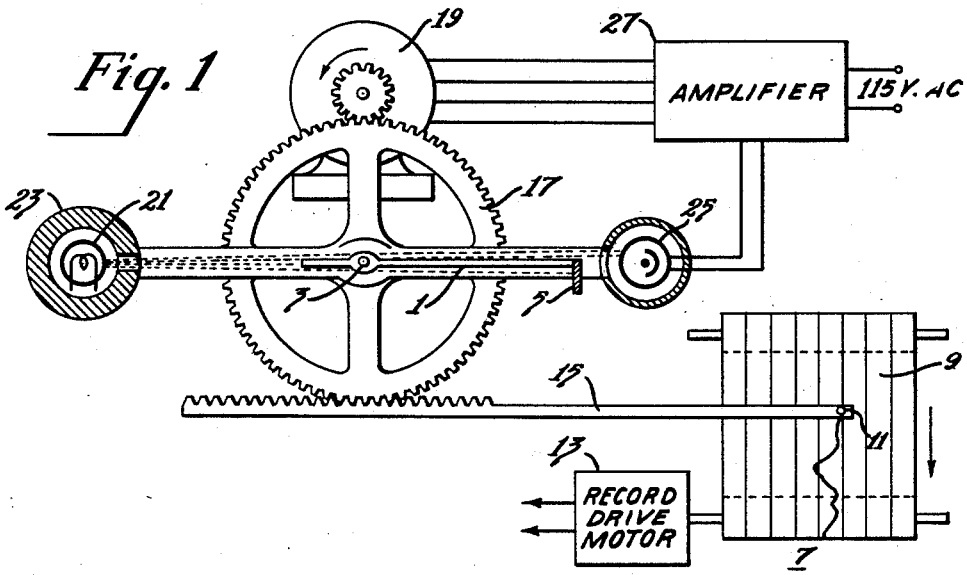
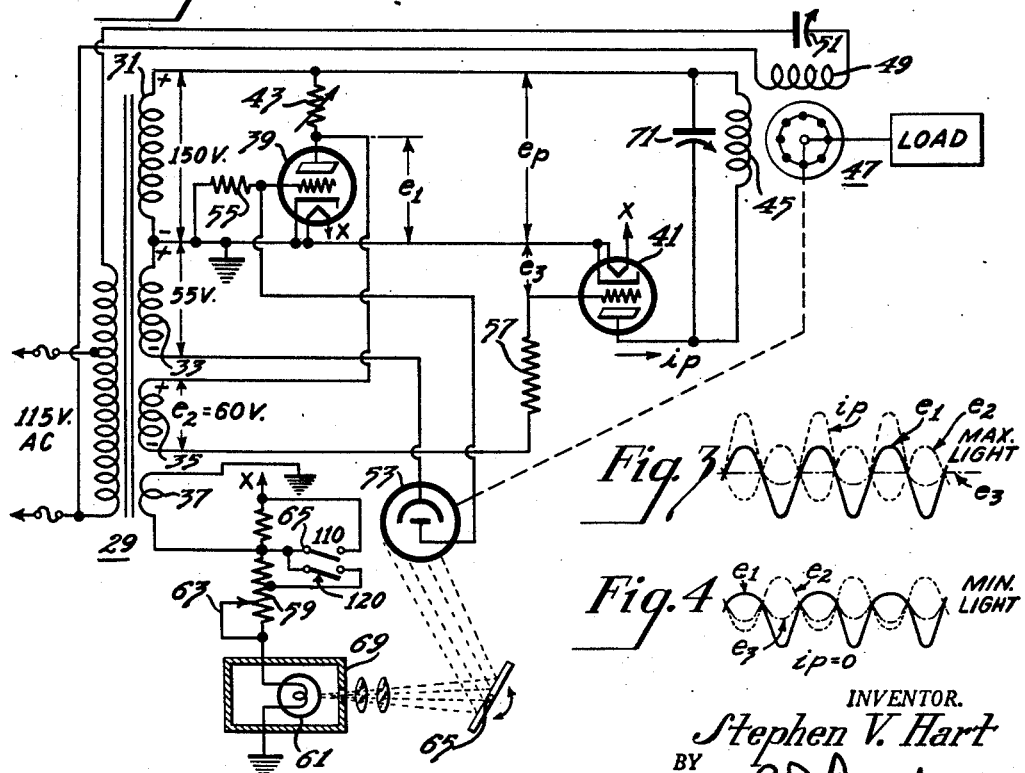
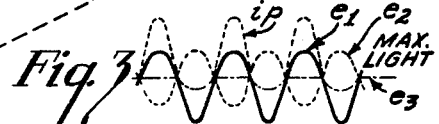
INVENTOR.
Stephen V. Hart
BY
ATTORNEY Patented Dec. 19, 1950

2,534,769

UNITED STATES PATENT OFFICE 2,534,769

PHOTOELECTRIC MOTOR CONTROL

Stephen V. Hart, New York, N. Y., assignor to Radio Corporation of America, a corporation of Delaware Application August 29, 1946, Serial No. 693,792

9 Claims. (Cl. 318—31)

1

This invention relates to light responsive control systems and in particular to a highly sensitive control device for translating the movement of a control member having no appreciable power, into the movement of a responsive device which may require a substantial amount of power.

Devices of the general type of which this invention is an example, have frequently been employed to obtain a mechanical advantage in the movement of an output member where the controlling member is of such a nature that it is impossible to couple directly to it or to derive sufficient energy from its movement to produce the desired result.

Systems of this type are generally known as "follower" systems and have many useful applications in controlling the movement or position of a remotely located object. Systems have been proposed in which the control element interrupts a light beam which is focused on a light responsive device which operates a relay to control the application of power to a motor, for example. It will be appreciated that the motor can be of such size and power as is required to accomplish any desired function, for example, opening a door, and that no load will be placed upon the control member since it merely serves to interrupt a beam of light. The primary purpose of this invention is to provide an improved follower system of the type described.

In many applications it is desirable to apply to the input system a reaction which is dependent upon the condition of the output member and thus to produce a balanced system of the type in which a movement of the control element in a given direction upsets the initial balance of the system which then operates to drive the output system in the direction necessary to restore the system to its original condition of balance. Systems of this type are known as "servo systems" and it is a further purpose of this invention to provide an improved servo system operating by means of a light beam.

In many cases where a phototube is employed to control the operation of a follower or a servo system it is essential to obtain a high degree of sensitivity so that slight changes in the amount of light impinging on the phototube, as a result of the motion of the control member, are sufficient to produce a current capable of performing the required work. Where an intermittent type of operation is satisfactory, this may most readily be accomplished by means of sensitive mechanical relays. However, where a continuous adjustment of the current utilized to drive the

2 output device is required, an amplifier employing electron discharge devices is more practical. It is therefore a further object of this invention to provide an improved amplifier for controlling the operation of an output device in response to a small change of impedance, such as that produced by the illumination of a photoelectric tube, and which has the additional advantage of being entirely A. C. operated.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a view illustrating the mechanical arrangement of a light responsive control system useful in the practice of this invention;

Figure 2 is a circuit diagram of a phototube amplifier utilized in a control system of the type described; and Figures 3 and 4 are curves illustrating the operation of the amplifier illustrated in Fig. 2.

Referring to Fig. 1, the control element 1 is a rotatable vane mounted for rotation about a shaft 3 and having at its end a shield 5. The control element is assumed to be rotated by any changing condition such as a variation in voltage, pressure, heat or the like, through any conventional means, which it is desired to record as a function of time on a chart recorder 7. The recorder includes a conventional sheet of recording paper 9 provided with spaced lines to indicate degrees of temperature, for example, which is driven past a recording pin 11 by a record drive motor 13. The recording pin 11 moves laterally across the paper to record variations of temperature, for example, by means of a ratchet 15 driven by the engaging tooth of a gear 17 which is in turn caused to rotate through a small angle by an alternating current induction motor 19. Fixedly mounted on gear 17 is a light source 21 and in its normal position effectively covers approximately one-half of the sensitive area of the phototube. Thus, a small rotation of the control member 1 in a clockwise direction will permit an increased amount of light to impinge on the phototube and will therefore increase the phototube current. On the other hand, a slight counterclockwise rotation of the control member 1 will reduce the amount of light impinging on the phototube or cut it off entirely.

The phototube output voltage is applied to an amplifier 27 which is energized from the alternating current lines and which provides energizing current to the motor 19. The latter tends to rotate in a counterclockwise direction, in the example illustrated, when suitably energized by amplifier 27. The lamp housing or shield 23 is of substantial weight and provides a turning moment of sufficient force to cause gear 17 to turn in a counterclockwise direction when motor 19 is not energized. Consequently, as energizing current to the motor is increased, a condition of balance will be reached in which the system remains stationary. Increasing energizing current beyond this point will cause the motor to overcome the gravitational force tending to rotate the gear 17 and will cause it to rotate in a clockwise direction. The current supplied by amplifier 27 is controlled by the output of phototube 25 and is so adjusted that when the photocell is illuminated for approximately one-half its area, the energizing current to the motor is just sufficient to hold the system in a balanced condition. It will therefore be observed that if the control element 1 is rotated in one direction or the other, the system will respond, causing the phototube to rotate a like amount until the original condition of balance has been restored.

Referring now to Fig. 2, a novel alternating current amplifier is illustrated. The primary of a transformer 29 is connected to the commercial power lines. The transformer contains four separate secondary windings, the first, 31, having a terminal voltage of approximately 150 volts, the second, 33, having a terminal voltage of approximately 55 volts, the third, 35, having a terminal voltage of approximately 60 volts, and the fourth, 37, having a terminal voltage of 6.3 volts, or whatever other value is required to heat the filaments of the amplifier tubes employed. The lower terminal of secondary 31 is connected to ground and to the cathode of a voltage amplifier tube 39 and a power amplifier tube 41. The upper terminal of secondary 31 is connected to the plate of tube 39 through an adjustable resistor 43 and also through one winding 45 of an induction motor 47 to the plate of the power amplifier 41. Although any type of A. C. motor may be employed, a two phase induction motor of the drag cup type is preferred. Such motors require two field windings which produce phase-displaced fields. A second field winding 49 connected through a series capacitor 51 to the power terminals is therefore employed.

The second secondary 33 has its upper terminal grounded. The lower terminal is connected to the anode of the photoelectric tube 53, the cathode of which is connected to the grid of voltage amplifier tube 39. A grid leak resistor 55 is also connected between the grid and ground.

The third secondary, 35, is serially connected between the plate of amplifier plate 39 and the grid of power amplifier tube 41, the circuit including a limiting resistor 57.

The fourth secondary 37 has one terminal connected to ground and the other terminal is connected to a tap intermediate the ends of a low resistance resistor 59, one end of which is connected to the heaters of the various tubes and the other end of which is connected to the filament of the light source 61 and thence to ground. The intensity of illumination of the light 61 may be adjusted by a sliding contact 63 on resistor 59. For the purpose of adjusting the apparatus to a low or high line voltage, a switch 65 is employed which shorts out small sections of resistor 59 to adjust both the heater current and the current flowing through lamp 61.

As an alternative to the shield method illustrated in Fig. 1, the control element may take the form of a rotating mirror 65 which reflects a light beam 67, produced by an aperture in the lamp housing 69, so as to illuminate approximately one-half of the active area of the cathode of phototube 53. The dashed line connecting the motor and the phototube indicates that the phototube 53 may be mounted for rotation with respect to the control element or mirror 65 in response to rotation of the motor 47 in a manner similar to that illustrated in Fig. 1.

It will be observed from Fig. 2 that two alternating voltages of opposite instantaneous polarity, that is, opposite phase, are applied to the grid of power amplifier tube 41. The first of these voltages is that developed between ground and the plate of amplifier tube 39 and indicated as voltage $e_1$. The second of these is the voltage developed across the third secondary 35 of transformer 29, and is indicated as voltage $e_2$. The instantaneous difference voltage is indicated as $e_3$ and appears between the cathode and the grid of the power amplifier. Since amplifiers 39 and 41 are both inoperative during the alternate half cycles in which a negative voltage is applied to their plate electrodes, in the following discussion it will be sufficient to consider only the operation during the positive half cycles, i. e. when $e_p$ is positive. If a negative voltage is applied to the grid of amplifier 39 so that there is substantially no plate current flowing through the tube, it will be seen that voltage $e_1$ will be substantially equal to the voltage of the secondary 31 and will have a greater amplitude than voltage $e_2$. If, however, the voltage of the grid of amplifier 39 is made more positive so that plate current flows through resistor 43, the voltage $e_1$ will decrease and, by a suitable selection of resistor 43, may be made to have a value less than that of $e_2$. It follows therefore that there is an intermediate value of grid voltage between the two extremes which will, for a given value of resistance 43, make voltages $e_1$ and $e_2$ equal. Thus the grid voltage applied to the power amplifier 41 may be controlled through any desired range by the application of suitable voltages to the grid of the amplifier 39.

If power amplifier 41 is of such a type that substantial plate current flows for zero or slightly positive grid voltage, the plate current will be as illustrated by the curve $i_p$ in Fig. 3. Where voltages $e_1$ and $e_2$ are equal in amplitude and of opposite phase or substantially so, the grid voltage $e_3$ will be approximately zero and plate current $i_p$ will flow during the positive half cycles of the applied plate voltage $e_p$. Field winding 45 of motor 47 is tuned to parallel resonance by a capacitor 71 and therefore introduces substantially no phase shift into the plate circuit. Under these conditions the motor receives its maximum actuation, and will rotate in a counter clockwise direction. Since the plate voltage $e_p$ is in phase with voltage $e_1$, decreasing the amplitude of voltage $e_1$ by applying a more positive voltage to the grid of amplifier 39 reduces the plate current as shown in Fig. 4. The case illustrated is that in which no plate current flows since the grid voltage $e_3$ is negative when the plate voltage is positive and the voltage is therefore negative during each half cycle when the applied grid voltage is positive. Consequently the energizing current to motor 47 is cut off and the torque produced by the weight of the shield 23 tends to rotate the gear 17 in a counterclockwise direction.

When light strikes the cathode of the phototube, the phototube impedance decreases and a voltage is produced across resistor 55 making the grid of tube 39 more negative. Consequently, the zero current condition illustrated in Fig. 4 corresponds to that in which there is a minimum of light on the phototube, and the maximum energizing current condition illustrated in Fig. 3 corresponds to the maximum light condition. It may be seen, therefore, that a value of light intermediate between the two conditions will produce a small energizing current. This is the current necessary to maintain a balance between the motor torque and the gravity moment to hold the system stationary. If, however, control element 1 is rotated clockwise, the amount of light impinging on the phototube 25 will be increased, thus increasing the driving torque of motor 19 to cause the gear 17 to rotate in a clockwise direction to restore the system to balance. On the other hand, if control element 1 is rotated a small amount in a counterclockwise direction, the light will be cut off from phototube 25, the energizing current will be reduced, thus permitting the gravity moment to turn the gear 17 in a counterclockwise direction a sufficient amount to restore the system once more to balance.

While this invention has been described by means of a servo system in which rotation in one direction is accomplished by a gravity moment due to the weight of shield 23, the equivalent result may be obtained by employing a spring to provide the continuous force imposing the rotational torque on the motor.

An A. C. operated amplifier has thus been described which may be employed to control the torque of a motor by varying a variable impedance device, illustrated by means of a system for controlling the light intensity applied to a light responsive device such as a phototube. A high degree of sensitivity resulting in extreme accuracy of operation has been obtained through the employment of two alternating voltages in phase opposition to provide the grid voltage of a power amplifier, the amplitude of one of these voltages being controlled by the impedance of a phototube. While the invention has been illustrated by describing a system operated by interrupting a beam of light, it will be understood that the motor control may be effected by utilizing a heat sensitive cell, or any similar device sensitive to a form of radiant energy capable of being interrupted or controlled, or an impedance element susceptible of manual or automatic variation.

What I claim is:

1. A light responsive control system comprising an alternating current motor, light responsive means, a thermionic discharge device having grid and anode electrodes, means including a series circuit through said motor for applying a first alternating voltage to said plate electrode, means for applying a second voltage in phase with said first alternating voltage and a third voltage of opposite phase to said grid electrode so that the potential thereof is determined by the difference in amplitude between said second and third voltages said means comprising a tube across which one of said voltages is developed, and means for controlling the amplitude of one of said voltages as a function of the amount of light falling on said light responsive means so that the motor runs when said light falling on said responsive means exceeds a predetermined amount.

2. A device of the character described in claim 1 in which said tube for controlling the amplitude of one of said voltages includes a grid electrode whose potential is controlled by the potential developed by said light responsive means.

3. A light responsive control system comprising an alternating current motor, light responsive means, a thermionic discharge device having grid and anode electrodes, means including a series circuit through said motor for applying a first alternating voltage to said plate electrode, means for applying a second voltage in phase with said first alternating voltage and a third voltage of opposite phase to said grid electrode so that the potential thereof is determined by the difference in amplitude between said second and third voltages, said means comprising a tube across which one voltage is developed, and said tube for controlling the amplitude of one of said voltages as a function of the amount of light falling on said light responsive means including a control electrode whose potential is controlled by the potential developed by said light responsive means.

4. A light responsive control system comprising a light responsive device, a source of light, a movable control element for causing a predetermined amount of light to impinge on said device in accordance with the relative position of said control element and said device, a controlled element, a motor for moving said controlled element and said device in one direction when said motor is energized by a current exceeding a predetermined value, a discharge device having a control grid, said discharge device being in circuit with said motor for controlling the energizing current applied thereto, means for applying two alternating voltages of opposite phase to said control grid, one of which said voltages is developed across the output of an electron discharge device having a control grid, and means for controlling amplitude of one of said two voltages as a function of the amount of light impinging on said light responsive device whereby a movement of said movable control element produces a corresponding movement of said controlled element, said means for controlling the amplitude of one of said voltages including means for applying the voltage developed by said light responsive device to said control grid.

5. A light responsive control system comprising an alternating current motor, light responsive means, a translating means having a control electrode, means including a series circuit through said motor for applying a first alternating voltage to said translator, means for applying a second voltage in phase with said first alternating voltage and a third voltage of opposite phase to said control electrode so that the potential thereof is determined by the difference in amplitude between said second and third voltages, said means comprising a second translating device across which one voltage is developed, and said second translating device for controlling the amplitude of one of said voltages as a function of the amount of light falling on said light responsive means including a control electrode whose potential is controlled by the potential developed by said light responsive means.

6. A light responsive control system comprising a light responsive device, a source of light, a movable control element for causing a predetermined amount of light to impinge on said device in accordance with the relative position of said control element and said device, a controlled element, a motor for moving said controlled element and said device in one direction when said motor is energized by a current exceeding a predetermined value, a translating device having a control element, said translating device being in circuit with said motor for controlling the energizing current applied thereto, means for applying two alternating voltages of opposite phase to said control electrode, one of which said voltages is developed across the output of an electron amplifying device having a control element, and means for controlling the amplitude of one of said two voltages as a function of the amount of light impinging on said light responsive device whereby a movement of said movable control element produces a corresponding movement of said control element said means for controlling the amplitude of one of said voltages including means for applying the voltage developed by said light responsive device to said control element.

7. A light responsive control system comprising an alternating current motor, light responsive means, an amplifying device having a control electrode, means including a series circuit through said motor for applying a first alternating voltage to said amplifying device, means for applying a second voltage in phase with said first alternating voltage and a third voltage of opposite phase to said control electrode so that the potential thereof is determined by the difference in amplitude between said second and third voltages, said means comprising an amplifier across which one voltage is developed, and means for controlling the amplitude of one of said voltages as a function of the amount of light falling on said light responsive means so that the motor runs when said light falls on said responsive means.

8. A light responsive control system comprising a light responsive device, a source of light, a movable control element for causing an amount of light to impinge on said device in accordance with the position of said control element, a controlled element housing said source of light, a motor for moving said controlled element, variable impedance means in circuit with said motor for controlling the energized current of said motor, means for applying two voltages of opposite polarity to one point on said variable impedance means to control the impedance thereof, one of said voltages being developed across the output of an electron discharge device having a control grid, and means for controlling the amplitude of said one of said voltages as a function of the amount of light falling on said light responsive device, means for developing a voltage controlled by said light responsive device, said developed voltage being applied to said control grid.

9. A light responsive control system comprising a light responsive device, a source of light, a movable control element for causing a predetermined amount of light to impinge on said device in accordance with the relative position of said control element and said device, a controlled element, a motor for moving said controlled element and said device in one direction when said motor is energized by a current exceeding a predetermined value, a first discharge device having a control grid, said first discharge device being in circuit with said motor for controlling the energizing current applied thereto, means for applying two alternating voltages of opposite phase to said control grid of said first discharge device, one of said alternating voltages being developed across the output of a second discharge device having a control grid, means for controlling the amplitude of said one of said two voltages as a function of the amount of light impinging of said light responsive device, means for developing a voltage controlled by said light responsive device, said developed voltage being applied to the control grid of said second discharge device whereby a movement of said movable element produces a corresponding movement of said controlled element.

STEPHEN V. HART.

REFERENCES CITED

The following references are of record in the file of this patent:

UNITED STATES PATENTS

| Number | Name | Date |
| --- | --- | --- |
| 1,787,435 | Boll | Jan. 6, 1931 |
| 2,109,222 | Ryder | Feb. 22, 1938 |
| 2,112,218 | Gille | Mar 22, 1938 |
| 2,354,185 | Deitz | July 25, 1944 |
| 2,413,120 | Swanson | Dec. 24, 1946 |
| 2,423,534 | Upton | July 8, 1947 |

Certificate of Correction

Patent No. 2,534,769 December 19, 1950

STEPHEN V. HART

It is hereby certified that error appears in the printed specification of the above numbered patent requiring correction as follows:

Column 7, line 19, for the word "control" read *controlled*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*